United States Patent Office 3,736,353
Patented May 29, 1973

3,736,353
PROCESS FOR PRODUCTION OF
MELLITIC ACID
Eugene Paul Gosselink, Colerain Township, Hamilton County, and John H. Henderson, Springfield Township, Hamilton County, Ohio, assignors to The Procter & Gamble Company, Cincinnati, Ohio
No Drawing. Filed Mar. 31, 1971, Ser. No. 130,019
Int. Cl. C07c 51/26
U.S. Cl. 260—523 A                           9 Claims

ABSTRACT OF THE DISCLOSURE

An improved process for synthesizing mellitic acid by two-stage nitric acid oxidation of hexakis(methoxymethyl)benzene. Specification of particular reaction procedures maximizes product yield and minimizes the need for expensive high pressure reaction equipment.

BACKGROUND OF THE INVENTION

(1) Field of the invention

This invention relates to an improved two-step process for the production of mellitic acid, $C_6(COOH)_6$. Mellitic acid is useful as a builder and sequestering agent in detergent compositions. The process steps involve two-stage nitric acid oxidation of a substituted benzene compound [hexakis(methoxymethyl)benzene] to mellitic acid.

(2) Description of the prior art

Nitric acid oxidation of substituted aromatic compounds to benzene polycarboxylates is well-known in the art. The conditions under which such oxidation takes place vary widely with the nature and degree of aromatic ring substitution. (See, for example, British Pats. 771,086; 786,382 and 1,026,365 of Bergwerksverband G.m.b.H.) Complete nitric acid oxidation to mellitic acid can be accomplished under certain circumstances by employing high temperatures, pressures, and reactant concentrations. Such harsh reaction conditions, however, generally require expensive, high pressure, corrosion resistant process equipment. Although such oxidation processing expense may be mitigated somewhat by altering the nature of the benzene substituents before oxidation, this technique necessarily involves an additional process step (usually chloromethylation) when commercially available polyalkybenzene feedstocks are utilized.

Accordingly, it is an object of the present invention to provide a mellitic acid preparation process which employs a two-stage nitric acid oxidation procedure that minimizes the need for elaborate, high cost process equipment. It is a further object of the present invention to provide an efficient process for production of pure mellitic acid directly from a relatively inexpensive and available starting material, hexakis(methoxymethyl)benzene.

It has now been discovered that by employing a particular combination of two (and preferably three) nitric acid oxidation steps and by maintaining carefully selected reaction conditions throughout these steps, these objectives can be accomplished and that very pure mellitic acid can be produced more economically and more efficiently than with prior art processes.

SUMMARY OF THE INVENTION

An improved process for the synthesis of mellitic acid starting from hexakis(methoxymethyl)benzene is provided. The process comprises the steps of: (a) reacting each mole of hexakis(methoxymethyl)benzene with at least 30 moles of $HNO_3$ in the form of an aqueous nitric acid solution having a concentration of from about 10% to about 70% by weight at a temperature of from about 60° C. to about 120° C. for a period of from 15 to 180 minutes; and subsequently (b) heating the solution of step (a) to a temperature of from about 150° C. to about 250° C. at a pressure of from about 40 p.s.i.g. to about 250 p.s.i.g. for a period of 1 to 3 hours. The improved process of this invention produces pure mellitic acid in relatively high yield. In addition, high pressure equipment time and cost is minimized.

DETAILED DESCRIPTION OF THE INVENTION

At this juncture the individual steps of the improved process will be discussed in detail.

Step A—oxidation—first stage

The first stage of oxidation converts hexakis(methoxymethyl)benzene to a small amount of mellitic acid and to numerous other intermediate reaction products. Although hexakis(methoxymethyl)benzene probably could be converted completely to mellitic acid in a single, sustained high pressure-high temperature operation, it has been discovered that such an expensive, time consuming process can be avoided by utilization of this preliminary oxidation step in combination with subsequent steps described hereinafter.

Step A employs crystalline hexakis(methoxymethyl)benzene as a starting material. This starting material can be produced cheaply and efficiently by a 2-butyne-1,4-diol dimethyl ether trimerization process described in the concurrently filed U.S. patent application of Robert J. Crawford entitled "Process for Production of Hexakis(methoxymethyl)benzene," Ser. No. 130,020, filed Mar. 31, 1971.

This hexakis(methoxymethyl)benzene has the structural formula

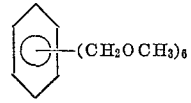

It is preliminarily oxidized with aqueous nitric acid having a concentration of from 10% to 70%. Dilute nitric acid of less than 10% renders oxidation unfeasibly slow. Nitric acid concentration above 70% is uneconomical in that an azeotrope forms at that point. During the course of this preliminary oxidation step, nitric acid concentration (on a water-$HNO_3$ basis) in the reaction vessel varies between 10% and 70% depending upon the initial acid concentration and the relative amounts of water boiled away and nitric acid consumed. In general, the nitric acid concentration (on a water-$HNO_3$ basis) will decrease as oxidation proceeds.

The preferred initial nitric acid concentration (on a water-$HNO_3$ basis) is prom about 45% to 55% by weight. At initial concentrations above the range, preliminary oxidation is vigorous and more costly process equipment is necessary to maintain the proper reaction temperature. At initial acid concentrations below this range, larger (and hence more expensive) equipment is necessary to handle the larger liquid volumes which are then involved.

At least 30 moles of $HNO_3$ per mole of hexakis(methoxymethyl)benzene are utilized to provent the final nitric acid concentration (on a water-$HNO_3$ basis) in the oxidation solution from falling below 10%. Preferably, from 40 to 60 moles of $HNO_3$ per mole of hexakis(methoxymethyl)benzene is employed to carry out the oxidation process of the instant invention. Unconsumed nitric acid can easily be recycled.

The preliminary oxidation (step A) is run at atmospheric pressure. At this pressure efficient oxidation occurs at temperatures ranging from about 60° C. to the azeotrope boiling temperature (approximately 120° C.). The preferred oxidation temperature is from about 90° C. to 100° C. Depending upon the oxidation temperature, the particular HNO₃ concentration, and the amount of hexakis(methoxymethyl)benzene being oxidized, the reaction runs from about 15 to 180 minutes. Completion of preliminary oxidation is indicated by the near cessation of gas evolution. Preferably this reaction step is run for at least 90 minutes.

A highly preferred embodiment of the instant invention includes an additional process step to be performed after the preliminary oxidation step (a). Such an additional step consists of evaporating the final oxidation solution of step (a) in order to decrease its volume. At completion of step (a), nitric acid concentration (on a water-HNO₃ basis) in the solution is relatively low since nitric acid has been consumed. Much of the remaining solution is thus merely water which, of course, contributes nothing toward oxidation of the mellitic acid intermediates. When boiled away, the vapor from liquid nitric acid solution of such low concentration has an even lower HNO₃ concentration than the liquid. Thus evaporating the oxidation solution of step (a) not only decreases the solution volume but also increases the nitric acid concentration therein. This reduction in volume and increase in concentration minimizes the process cost of the subsequent high pressure, high temperature step (b). Preferably, volume decreases of about 50% can be obtained by addition of the evaporation step. Since some HNO₃ is inevitably lost during evaporation, larger amounts of HNO₃ [40 to 60 moles of HNO₃ per mole of hexakis(methoxymethyl)benzene] must be employed when this preferred volume reduction step is utilized.

Step B—oxidation—second stage

As noted above, very little mellitic acid is formed during preliminary oxidation (step A). More stringent conditions are necessary to convert the intermediates produced by step A to mellitic acid, thereby increasing overall yield of this desired product.

The final oxidation is accomplished by subjecting the reaction mixture of the preliminary oxidation (step A) to higher temperatures and pressures. Temperatures from 150° C. to 200° C. can be employed. Below 150° C., oxidation to mellitic acid is slow and/or incomplete. Above 200° C. some molecular decomposition tends to occur which decreases mellitic acid yield. A temperature of from about 160° C. to 170° C. is preferred.

The final oxidation step is carried out at elevated pressure. The theoretical lower limit of the operable elevated pressure range is, of course, approximately the vapor pressure of a 70% nitric acid solution at 150° C. This corresponds to a pressure of about 40 p.s.i.g. Of course, if (as will almost always be the case) higher temperatures are employed or if the acid concentration drops below 70%, higher pressure will be necessary to remain at operating pressures above the vapor pressure of the oxidation solution. At a preferred average second-step oxidation temperature of from about 160° C. to 170° C., a pressure of from about 100 p.s.i.g. to 150 p.s.i.g. will be sufficient even if the nitric acid concentration should approach 10%. From an equipment cost standpoint, the preferred pressure for any given oxidation solution is the lowest pressure which still exceeds the solution vapor pressure at any given point in time. An operating pressure of 250 p.s.i.g. will always be above the vapor pressure of oxidation solution of the present invention. Operating pressures above 250 p.s.i.g. serve no useful purpose and are expensive (from an equipment standpoint) to maintain.

This second oxidation step is also run until gas evolution nearly ceases. Reaction completion occurs in about 1 to 3 hours.

The mellitic acid product can be isolated from the nitric acid oxidation solution by any conventional method known to the skilled artisan. For example, the reaction mixture may be recovered by evaporating or concentrating the nitric acid oxidation solution and collecting the resulting mellitic acid precipitate.

Total yield of mellitic acid from the combined hexakis(methoxymethyl)benzene oxidation steps can be as high as 65% of theoretical. The improved process of the present invention is illustrated by the following example:

EXAMPLE

Oxidation of hexakis(methoxymethyl) benzene to mellitic acid 170 grams of hexakis(methoxymethyl)benzene ½ mole), 2136 grams of 70% nitric acid (24 moles HNO₃) and 864 grams of distilled water [resulting nitric acid concentration (on a water-HNO₃ basis) of 49.7%] were added to a five-liter flask equipped with a condenser. The mixture was heated to 60° C. at 1 atmosphere pressure and vigorous evolution of reddish-brown gas began. After 55 minutes the temperature was up to 93° C. with no external heat applied and gas evolution had slowed. The mixture was then heated to 95° C. for 45 minutes and then cooled. After this preliminary oxidation, 813 grams of overhead were distilled off. 890 grams remained in the flask. A 5 ml. sample was removed.

735 ml. from the flask were charged to an autoclave. The mixture was heated to 122° C. in 35 minutes with the pressure increasing to 103 p.s.i.g. Autoclave pressure was held between 102 and 105 p.s.i.g. by releasing the evolving gases while the temperature was raised to 160° C. for 30 minutes. The temperature was then raised gradually over a 70 minute period to 168° C. while maintaining pressure between 98 and 108 p.s.i.g.

The reaction mixture was cooled, and 615 ml. (800 gm.) was removed from the autoclave. This solution was evaporated to 414 grams and filtered. Residue amounted to 160 grams of damp solid product.

This solid product was dissolved in water, neutralized with NaOH and separated as approximately 160 grams of sodium mellitate. A sample of this sodium mellitate so obtained was run through ion exchange apparatus, concentrated and treated with diazo-methane to form the hexamethyl ester of mellitic acid. The resulting esterified product was analyzed by gas chromatographic procedures and found to be over 95% pure. Based upon the amount of this 95% pure sodium mellitate recovered, mellitic acid yield from the oxidation steps was thus calculated as approximately 65%.

Substantially similar yields of mellitic acid are obtained when the pressure during step (b) is maintained at about 150 p.s.i.g.

Substantially similar yields of mellitic acid are obtained when during step (b) the pressure is maintained at about 250 p.s.i.g. and the reaction temperature is maintained at 150° C.

What is claimed is:

1. An improved process for the high yield synthesis of mellitic acid from hexakis(methoxymethyl)benzene, said process comprising the steps of:
   (a) reacting each mole of hexakis(methoxymethyl) benzene with at least 30 moles of HNO₃ in the form of an aqueous nitric acid solution having a concentration of from about 10% to about 70% by weight at a temperature of from about 60° C. to about 120° C. for a period of from 15 to 180 minutes; and subsequently
   (b) heating the solution of step (a) to a temperature of from about 150° C. to about 200° C. at a pressure of from about 40 p.s.i.g. to about 250 p.s.i.g. for a period of 1 to 3 hours.

2. A process according to claim 1 wherein enough nitric acid is employed to provide from about 40 to 60 moles of HNO₃ per mole of hexakis(methoxymethyl)benzene.

3. A process according to claim 2 wherein the temperature utilized in step (a) is from about 90° C. to 100° C.

4. A process according to claim 2 wherein the pressure utilized in step (b) is from about 100 p.s.i.g. to 150 p.s.i.g.

5. A process according to claim 2 wherein the temperature utilized in step (b) is from about 160° C. to 170° C.

6. A process according to claim 2 wherein the temperature utilized in step (a) is maintained from about 90° C. to 100° C. for at least 90 minutes, the pressure utilized in step (b) is from about 100 p.s.i.g. to 150 p.s.i.g., and the temperature utilized in step (b) is from about 160° C. to 170° C.

7. A process according to claim 6 wherein the initial concentration of nitric acid employed is from about 45% to 55% by weight.

8. A process according to claim 2 which comprises an additional step to be performed after step (a), said additional step comprising evaporating the reaction mixture of step (a) in order to decrease the volume of such mixture by up to about 50%.

9. A process according to claim 8 wherein the temperature utilized in step (a) is from about 90° C. to 100° C., the pressure utilized in step (b) is from about 100 p.s.i.g. to 150 p.s.i.g. and the temperature utilized in step (b) is from about 160° C. to 170° C.

References Cited

UNITED STATES PATENTS

| | | | |
|---|---|---|---|
| 2,966,514 | 12/1960 | Benning et al. | 260—524 |
| 2,302,462 | 11/1942 | Palmer et al. | 260—524 |

LORRAINE A. WEINBERGER, Primary Examiner

R. S. WEISSBERG, Assistant Examiner